(12) United States Patent
Feng

(10) Patent No.: US 6,906,466 B2
(45) Date of Patent: Jun. 14, 2005

(54) GENERATE ASSEMBLY AND LIGHTING ELEMENT FOR A PNEUMATIC TOOL

(75) Inventor: Shih Jung Feng, Taichung (TW)

(73) Assignees: Chin Yeh Meng Co., Taichung (TW); Ching Te Tang, Taichung (TW); Pei Chang Sun, Taichung (TW)

( * ) Notice: Subject to any disclaimer, the term of this patent is extended or adjusted under 35 U.S.C. 154(b) by 0 days.

(21) Appl. No.: 10/667,346

(22) Filed: Sep. 23, 2003

(65) Prior Publication Data

US 2005/0062428 A1 Mar. 24, 2005

(51) Int. Cl.$^7$ ................................................ H01J 13/46
(52) U.S. Cl. ........................ 315/55; 362/119; 362/192
(58) Field of Search ...................... 315/76, 55; 362/96, 362/119, 192, 513; 408/16

(56) References Cited

U.S. PATENT DOCUMENTS

| | | | | |
|---|---|---|---|---|
| 2,525,588 A | * | 10/1950 | Cameron et al. | ........... 362/119 |
| 3,845,291 A | * | 10/1974 | Portyrata | .................... 362/192 |
| 4,835,410 A | * | 5/1989 | Bhagwat et al. | ............... 307/64 |
| 4,973,205 A | * | 11/1990 | Spaulding | .................... 408/16 |
| 5,267,129 A | * | 11/1993 | Anderson | .................... 362/96 |
| 6,319,003 B2 | * | 11/2001 | Mosimann | .................... 433/126 |

* cited by examiner

Primary Examiner—Thuy Vinh Tran
(74) Attorney, Agent, or Firm—Rosenberg, Klein & Lee

(57) ABSTRACT

A generate assembly and a lighting element for a pneumatic tool includes a body having a channel and a first passage defined therein. The first passage has a first end communicating with an exhauster of the pneumatic tool and a second end extending to communicate with the channel and defining an opening in an inner periphery of the channel. A second passage defined in the body for exhausting exhaust gas. A generator is mounted in the body for generating electric power to the lighting element. The generator has a turbine extending into the channel and eccentrically corresponding to the opening in the inner periphery of the channel such that exhaust gas, from the pneumatic tool, drive the turbine due to the eccentric relation between the turbine and the opening. A sleeve is securely mounted around the body for airtightly closing the channel in the body.

10 Claims, 6 Drawing Sheets

US 6,906,466 B2

GENERATE ASSEMBLY AND LIGHTING ELEMENT FOR A PNEUMATIC TOOL

BACKGROUND OF THE INVENTION

1. Field of the Invention

The present invention relates to a generate assembly and a lighting element for a pneumatic tool, and more particularly to a generator and a lighting element for a pneumatic that the generate assembly generates electric power by using the exhaust gas from the pneumatic tool and the electric power is provided to the lighting of the present invention.

2. Description of Related Art

A conventional pneumatic tool in accordance with the prior art shown in FIG. 6 comprises body (7) and a pneumatic motor (not shown) is received in the body (7). The pneumatic motor (7) is provided to drive a shaft (72). The conventional pneumatic tool includes an inlet (72) allowing the compressed flowing into the conventional pneumatic tool for driving the pneumatic motor and an exhauster for exhaust gas from the conventional pneumatic.

However, the above conventional pneumatic tool only uses the compressed air to drive the pneumatic tool and the compressed air cannot be fully used. For fully using the compressed air, a generator is provided to be disposed in the pneumatic tool neat the inlet (72) of the pneumatic tool and used the air current to generate electric power. However, the powers of the generator and the pneumatic motor are reduced. For a swimming operation, the user must raise the pressure of the compressed air for driving the generator and the pneumatic motor. Unfortunately, an air current with a high pressure may damage the parts of the pneumatic tool.

The present invention has arisen to mitigate and/or obviate the disadvantages of the two conventional pneumatic tools.

SUMMARY OF THE INVENTION

The main objective of the present invention is to provide an improved generate assembly and lighting element for a pneumatic tool. The generate assembly uses the exhaust gas from the pneumatic to generate electric power that is provided to the lighting element.

To achieve the objective, the generate assembly and lighting element in accordance with the present invention comprises a body having a channel and a first passage defined therein. The first passage has a first end communicating with an exhauster of the pneumatic tool and a second end extending to communicate with the channel and defining an opening in an inner periphery of the channel. A second passage defined in the body for exhausting exhaust gas. A generator is mounted in the body for generating electric power to the lighting element. The generator has a turbine extending into the channel and eccentrically corresponding to the opening in the inner periphery of the channel such that exhaust gas, from the pneumatic tool, drive the turbine due to the eccentric relation between the turbine and the opening. A sleeve is securely mounted around the body for airtightly closing the channel in the body.

Further benefits and advantages of the present invention will become apparent after a careful reading of the detailed description with appropriate reference to the accompanying drawings.

DETAILED DESCRIPTION OF THE INVENTION

Figure 1:
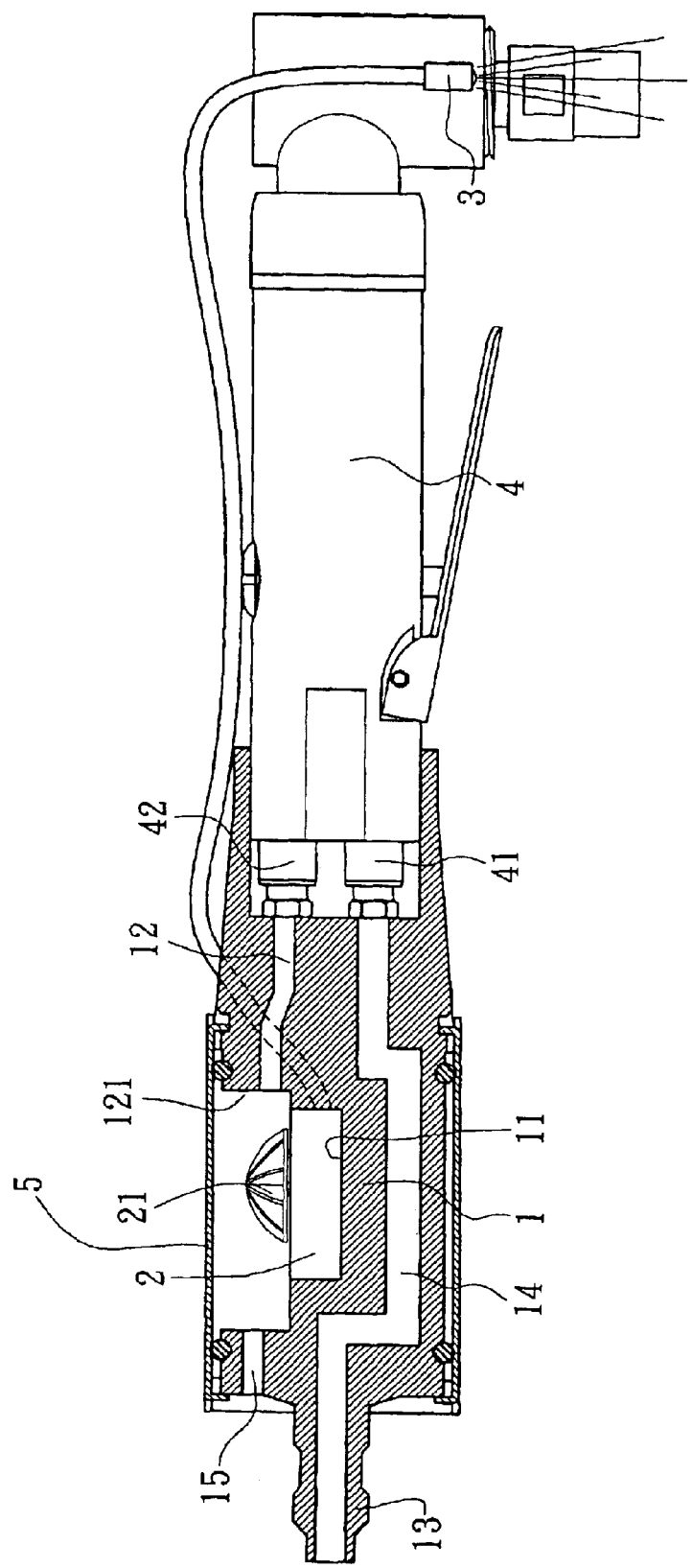
FIG. 1 is a schematic plan view in cross-section of a generate assembly and a lighting element for a pneumatic tool in accordance with the present invention.
Figure 2:
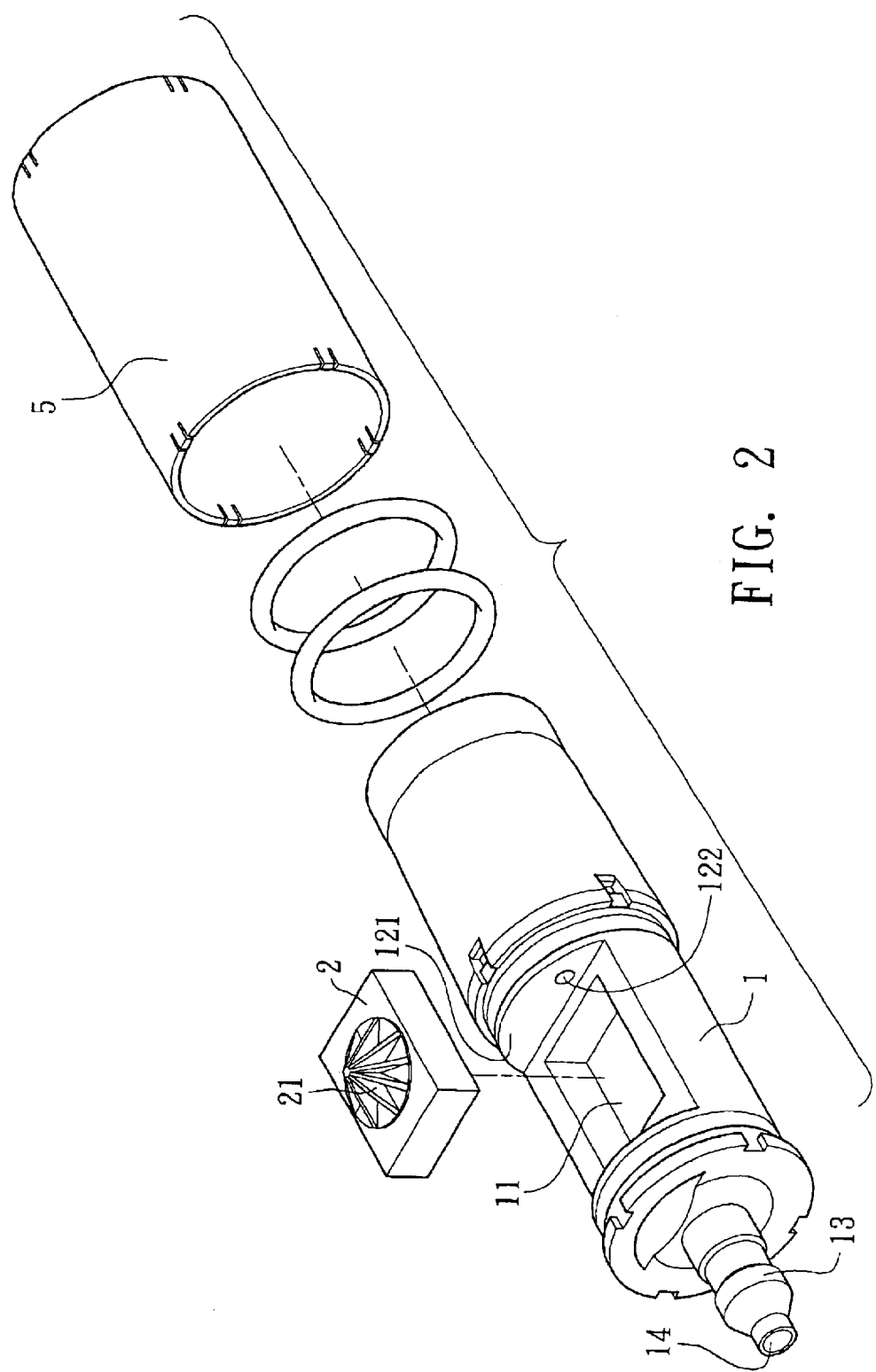
FIG. 2 is an exploded perspective view of the generate assembly in FIG. 1.

Referring to the drawings and initially to FIGS. 1 and 2, a generate assembly and a lighting element for a pneumatic tool in accordance with the present invention comprises body (1), a generator (2) mounted in the body (1), a sleeve (5) securely mounted around the body (1) and a lighting element (3) electrically connected to the generator (2). The pneumatic tool (4) includes an inlet (41) and an exhauster (42).

The body (1) is cylindrical and has a first end adapted to be longitudinally connected to the pneumatic tool and a second end longitudinally opposite to the first end of the body (1). A joint (13) extends from the second end of the body (1) and is adapted to be connected to a high-pressure air source. The body (1) includes a channel (121) defined therein and a cavity (11) defined in a bottom of the channel (121) in the body (1). A first passage (12) is defined in the body (1). The first passage (12) has a first end adapted to communicate with the outlet (42) of the pneumatic tool (4) and a second communicating with the channel (121) for forming an opening (122) in an inner periphery of the channel (211) and guiding the exhaust gas form the pneumatic tool (4) into the channel (121). The first passage (12) extends to the channel (121) and defines an opening (122) in an inner periphery of the channel (121). A second passage (15) is defined in the body (1). The second passage (15) has a first end communicating with the channel (121) and a second end extending to an outer periphery of the body (1) for exhausting the exhaust gas from the pneumatic tool (4). A third passage (14) is defined in the body (1). The third passage (14) has a first end adapted to communicate with the inlet (41) of the pneumatic tool and a second end longitudinally extending through the joint (13) for allowing the compressed air flowing into the pneumatic tool.

The generator (2) is received in the cavity (11) in the body (1) and has as turbine (21) extending into the channel (121). The turbine (21) eccentrically corresponds to the opening (122) such that the exhaust gas from the pneumatic tool (4) drives the turbine (21) after flowing through the first passage (12).

The lighting element (3) is electrically connected to the generator (2) by wires. In the preferred embodiment of the present invention, the lighting element (3) is a light emitting diode (LED) and mounted near an operation end of the pneumatic for providing light during operating the pneumatic tool.

The sleeve (5) is securely mounted around the body (1) and airtightly closes the channel (121).

Figure 3:
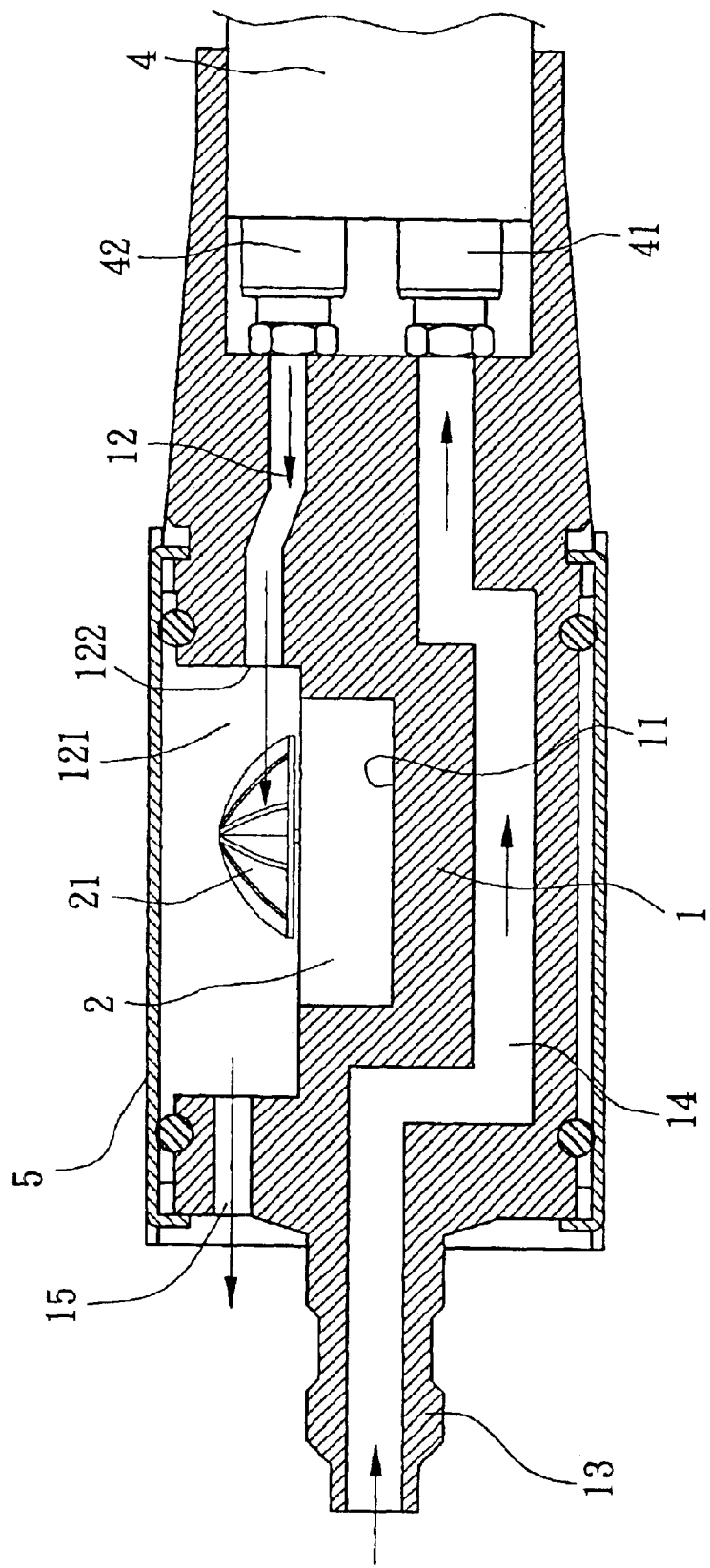
FIG. 3 is a cross-sectional view of the generate assembly of the present invention for showing the direction of the air current in the generate assembly of the present invention.
Figure 4:
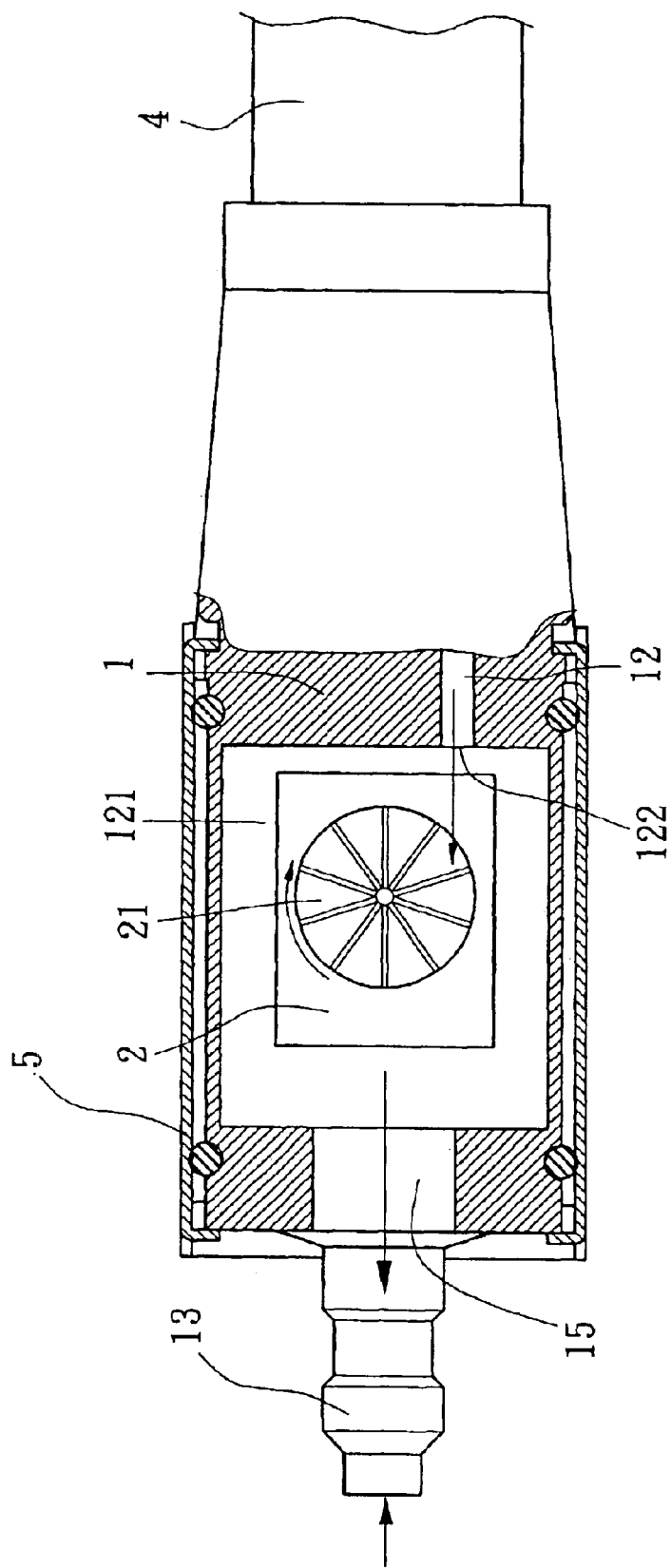
FIG. 4 is a top plan view in partial cross-section for showing the air current driving a generator of the generate assembly of the present invention.

With reference to FIGS. 3 and 4, the compressed air flows into the pneumatic tool (4) via the joint (13) and the third passage (14). The exhaust gas, from the pneumatic tool (4), flows into the channel (121) via the first passage (12), blows the turbine (21) for driving the generator (2) to generate electric power that is provided to the lighting element (3) and is exhausted form the body (1) via the second passage (15).

As described above, the generator (2) generates electric power by using the exhaust gas from the pneumatic tool (4) such that the power of the pneumatic tool should not be reduced and the light element (3) uses the electric power from the generator (2) such that an extra power is unnecessary to the lighting element (3) of the present invention. The generate assembly in accordance with the present invention makes use of exhaust gas from the pneumatic tool (4).

Figure 5:
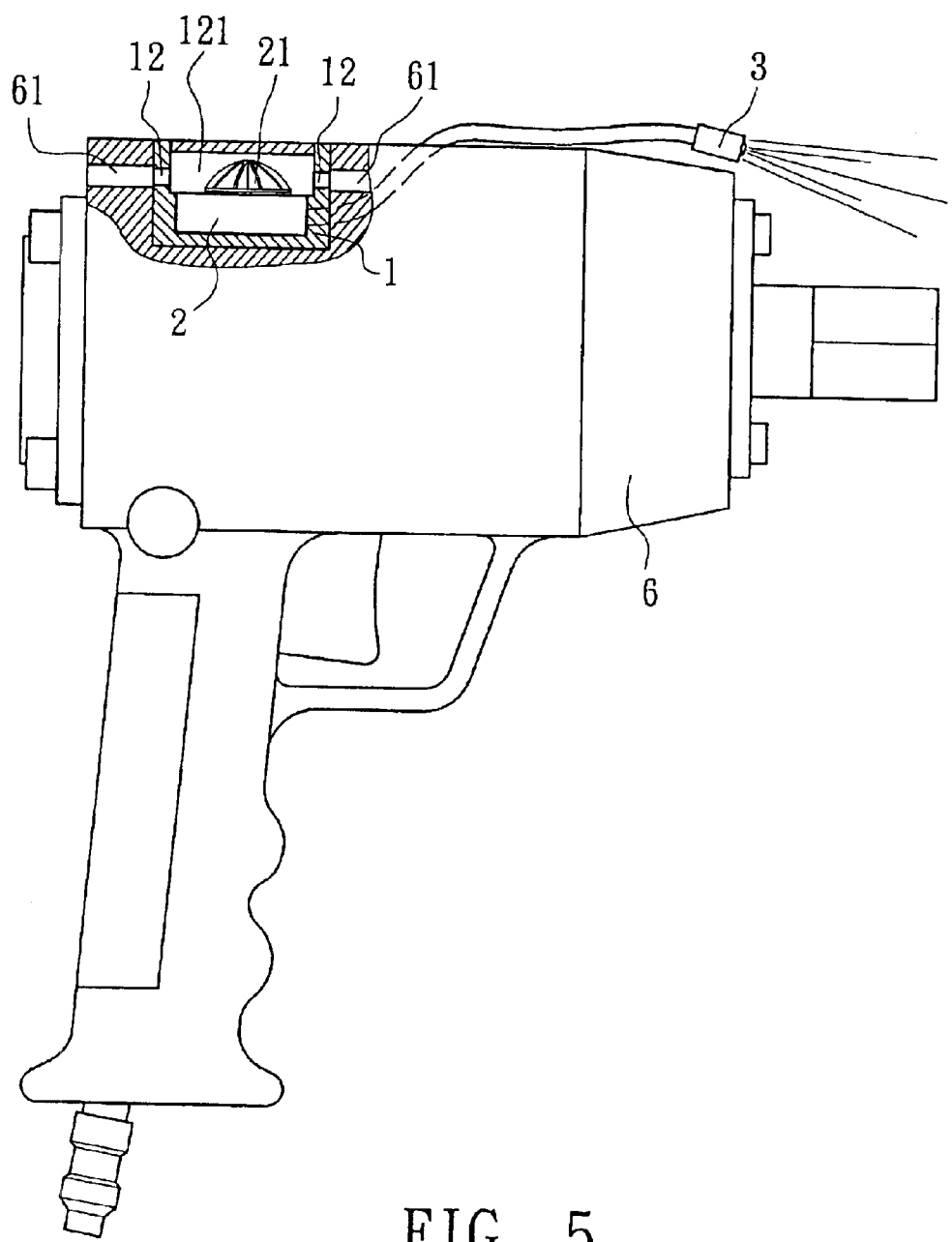
FIG. 5 is a cross-sectional view of a second embodiment of the generate assembly in accordance with the present invention.
Figure 6:
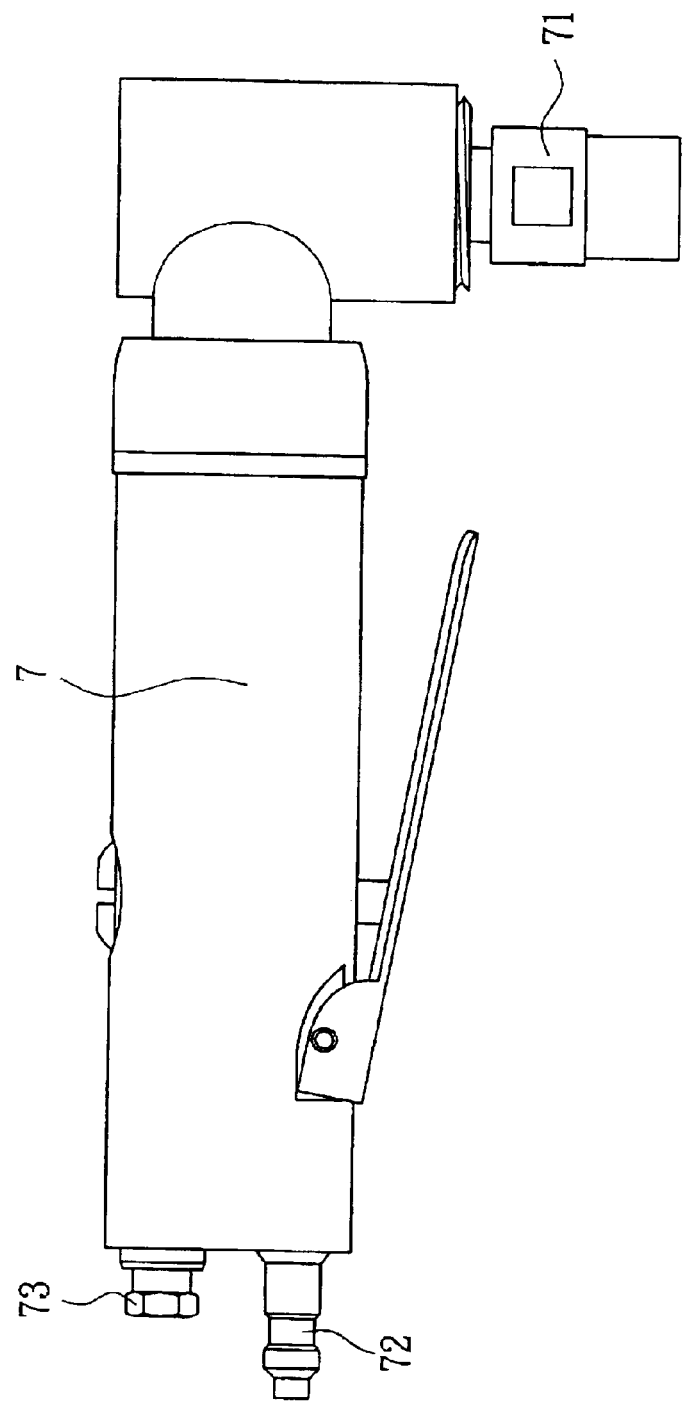
FIG. 6 is a side plan view of a conventional pneumatic tool in accordance with the prior.

With reference to FIG. 5, the generator (2) is adapted to be mounted in the pneumatic tool (6) and corresponding to an exhaust passage (61) in the pneumatic tool (6). The turbine (21) eccentrically corresponds to the exhaust passage (61) in the pneumatic tool (6). The second embodiment of the present invention can achieve the effect of the first embodiment of the present invention as described above.

Although the invention has been explained in relation to its preferred embodiment, it is to be understood that many other possible modifications and variations can be made without departing from the spirit and scope of the invention as hereinafter claimed.

What is claimed is:

1. A generate assembly and lighting element for a pneumatic tool, comprising:
   a body including:
      a channel defined therein;
      a first passage defined in the body, the first passage having a first end adapted to communicate with an exhaust outlet of a pneumatic tool and a second end in fluid communication with the channel through an opening in an inner periphery of the channel for camming exhaust gas from the pneumatic tool to the channel; and
      a second passage defined in the body, the second passage having a first end in fluid communication with the channel and a second end extending to an outer periphery of the body for exhausting exhaust gas from the channel;
   a generator mounted in the body for generating electric power to the lighting element, the generator having a turbine extending into the channel and being in eccentric correspondence with the opening in the inner periphery of the channel for exhaust gas from the pneumatic tool to drive the turbine;
   the lighting element being adapted to be attached to an operation end of the pneumatic tool and electrically connected to the generator; and,
   a sleeve securely mounted around the body for airtightly closing the channel in the body.

2. The generate assembly and the lighting element as claimed in claim 1, wherein the body comprises a cavity defined in a bottom of the channel for receiving the generator.

3. The generate assembly and the lighting element as claimed in claim 2, wherein the body comprises a third passage defined therein, the third passage having a first end in fluid communication with an inlet of the pneumatic tool and a second end extending to an outer periphery of the body for carrying compressed air to the pneumatic tool.

4. The generate assembly and the lighting element as claimed in claim 3, wherein the body includes a joint extending therefrom opposite to the pneumatic tool and adapted to be connected to a compressed air source, the joint being fluidly coupled to the second of the third passage.

5. The generate assembly and lighting element as claimed in claim 2, wherein the lighting element is a light emitting diode.

6. The generate assembly and the lighting element as claimed in claim 1, wherein the body comprises a third passage defined therein, the third passage having a first end in fluid communication with an inlet of the pneumatic tool and a second end extending to an outer periphery of the body for carrying compressed air to the pneumatic tool.

7. The generate assembly and the lighting element as claimed in claim 6, wherein the body includes a joint extending therefrom opposite to the pneumatic tool and adapted to be connected to a compressed air source, the joint being fluidly coupled to the second of the third passage.

8. The generate assembly and lighting element as claimed in claim 7, wherein the lighting element is a light emitting diode.

9. The generate assembly and lighting element as claimed in claim 6, wherein the lighting element is a light emitting diode.

10. The generate assembly and lighting element as claimed in claim 1, wherein the lighting element is a light emitting diode.

* * * * *